United States Patent [19]
Blom et al.

[11] Patent Number: 5,841,245
[45] Date of Patent: *Nov. 24, 1998

[54] DISCHARGE LAMP IGNITION CIRCUIT HAVING A BANDPASS FILTER CONNECTING THE PULSE TRANSFORMER TO THE LAMP

[75] Inventors: Anton C. Blom; Frans Slegers, both of Eindhoven, Netherlands

[73] Assignee: U.S. Philips Corporation, New York, N.Y.

[ * ] Notice: The term of this patent shall not extend beyond the expiration date of Pat. No. 5,534,753.

[21] Appl. No.: 685,156

[22] Filed: Jul. 23, 1996

Related U.S. Application Data

[63] Continuation of Ser. No. 413,059, Mar. 29, 1995, abandoned.

[30] Foreign Application Priority Data

Apr. 6, 1994 [EP] European Pat. Off. ............. 94200930

[51] Int. Cl.⁶ ................................................ H05B 41/14
[52] U.S. Cl. .................... 315/289; 315/290; 315/DIG. 5; 315/276
[58] Field of Search ...................................... 315/219, 289, 315/291, 290, 244, DIG. 5, 276; 363/39; 307/105, 106

[56] References Cited

U.S. PATENT DOCUMENTS

| 3,476,977 | 11/1969 | Hallay ...................................... 315/289 |
| 3,553,526 | 1/1971 | Moerkens ................................. 315/98 |
| 3,675,078 | 7/1972 | Levy ........................................ 315/289 |
| 4,723,097 | 2/1988 | Heindl et al. ............................ 315/289 |
| 4,749,914 | 6/1988 | Feher et al .............................. 315/246 |
| 5,084,655 | 1/1992 | Van Zanten ............................. 315/290 |
| 5,087,859 | 2/1992 | Blankers ............................. 315/209 R |
| 5,534,753 | 7/1996 | Blom et al. .............................. 315/244 |

FOREIGN PATENT DOCUMENTS 0507396  10/1992  European Pat. Off. ............... 315/219

*Primary Examiner*—Robert Pascal
*Assistant Examiner*—Aronld Kinkead
*Attorney, Agent, or Firm*—Edward Blocker

[57] ABSTRACT

In an ignition circuit for a high-pressure discharge lamp having a pulse generating circuit in which ignition pulses are generated by a voltage-dependent breakdown element and a pulse transformer, a bandpass circuit has been inserted between the secondary winding of the pulse transformer and the discharge lamp. The bandpass filter is tuned to the fundamental frequency or a harmonic of the pulses generated by the pulse generation circuit.

5 Claims, 2 Drawing Sheets

DISCHARGE LAMP IGNITION CIRCUIT HAVING A BANDPASS FILTER CONNECTING THE PULSE TRANSFORMER TO THE LAMP

This application is a continuation of Ser. No. 08/413,059 filed Mar. 29, 1995 now abandoned.

BACKGROUND OF THE INVENTION

1. Field of the Invention

The invention relates to a circuit arrangement for igniting a high-pressure discharge lamp, provided with input terminals for connecting a supply source;

a pulse-generating circuit with a natural frequency and provided with a voltage-dependent breakdown element;

a pulse transformer; and an electrical connection between a secondary winding of the pulse transformer and lamp connection terminals.

2. Description of the Related Art

A circuit arrangement of the kind mentioned in the opening paragraph is known from U.S. Pat. No. 5,087,859.

The known circuit arrangement forms part of a circuit for operating and igniting a high-pressure discharge lamp as part of a projection TV system. Special requirements as to dimensions and luminous efficacy are imposed on a lamp if it is to be suitable for such an application. This results in that an ignition pulse of more than 10 kV, often even more than 20 kV, is required for reliable ignition of the lamp. A further requirement imposed on the ignition circuit is that an extinguished lamp which has not or hardly cooled down must be capable of quick re-ignition. Such hot re-ignition requires a re-ignition pulse of a level corresponding to that of the ignition pulse.

In the known circuit arrangement, the voltage pulse generated in the pulse transformer is applied directly from the secondary winding to the lamp connection terminals.

The known circuit arrangement forms part of a switch mode power supply provided with a commutator circuit in which several semiconductor switches are periodically switched into the conductive and non-conductive state during (lamp) operation. It was found in practice that lamp ignition by means of the known circuit arrangement may cause one or several of the semiconductor switches of the switch mode power supply to become defective. This is a problem. The use of a decoupling capacitor between the input terminals for the connection of a supply source does not provide a substantial improvement here.

SUMMARY OF THE INVENTION

The invention has for its object to provide a solution to the problem described above of defective semiconductor switches in the switch mode power supply during ignition of the connected lamp.

According to the invention, this object is achieved in that a circuit arrangement of the kind mentioned in the opening paragraph is characterized in that the secondary winding of the pulse transformer and the lamp connection terminals form part of a pass filter with a tuning chosen in relation to the natural frequency of the pulse generating circuit.

The inventors have found that especially signals of very high frequency may arise the moment breakdown occurs in the lamp, which high-frequency signals cause the semiconductor switches present in the circuit arrangement to become defective. Thanks to the measure according to the invention, said signals of very high frequency are damped to a considerable degree.

The circuit arrangement according to the invention has the advantage that the circuit formed by the secondary winding of the pulse transformer and the lamp connection terminals constitutes a pass filter by which a pulse generated in the pulse generating circuit is converted into an ignition pulse across the connected lamp with only slight losses, while signals with other frequencies are strongly damped in the tuned circuit. The tuning may be chosen to be a harmonic frequency of the natural frequency of the pulse-generating circuit. In an advantageous embodiment, the tuning is chosen to be at or adjacent the natural frequency itself. It was surprisingly found that a favourable result is achieved with such a tuning both as to an efficient coupling-in of the ignition pulse and as to the prevention of semiconductor switches becoming defective.

It was found to be advantageous that additional inductive means are present in the pass filter between the secondary winding and at least one of the lamp connection terminals. This was found to be effective in counteracting defects in semiconductor switching elements during lamp breakdown where the additional inductive means were also included in the lamp operating circuit. During lamp operation, these additional inductive means represent a negligible impedance and accordingly do not give rise to any appreciable dissipation. This is in contrast to resistive means which are suitable in principle for being used as elements of the lowpass filter. The measure is particularly effective when the additional inductive means are provided symmetrically as regards their values relative to the lamp connection terminals.

To counteract the occurrence of interference fields owing to the pulse generation, it is advisable that the conductor from the secondary winding of the pulse transformer to one of the lamp connection terminals is constructed as a coaxial conductor. Preferably, the sheath of the coaxial conductor is in direct electrical contact with another one of the lamp connection terminals. The value of the capacitance formed by the coaxial conductor is one of the factors determining the tuning of the pass filter. In addition, the pass filter in conjunction with the pulse-generating circuit is given a characteristic of a band-pass filter thereby.

BRIEF DESCRIPTION OF THE DRAWINGS

The above and further aspects of the invention will be described in more detail with reference to a drawing of an embodiment, in which.

DESCRIPTION OF THE PREFERRED EMBODIMENTS

Figure 1:
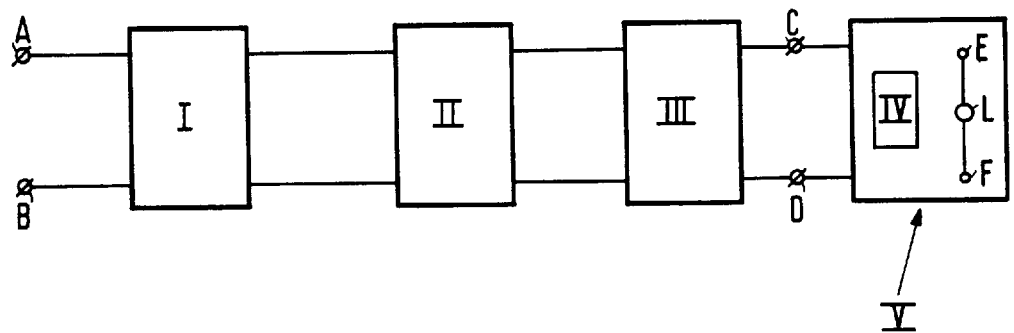
FIG. 1 is a diagram of a circuit for igniting and operating a lamp of a TV system.

In FIG. 1, A, B are connection terminals for connection to a supply voltage source, for example, a public mains of 220 V, 50 Hz. Rectification of the supply voltage takes place in I. Circuit I may also comprise provisions for preventing mains voltage pollution owing to the operation of the circuit arrangement.

Figure 2:
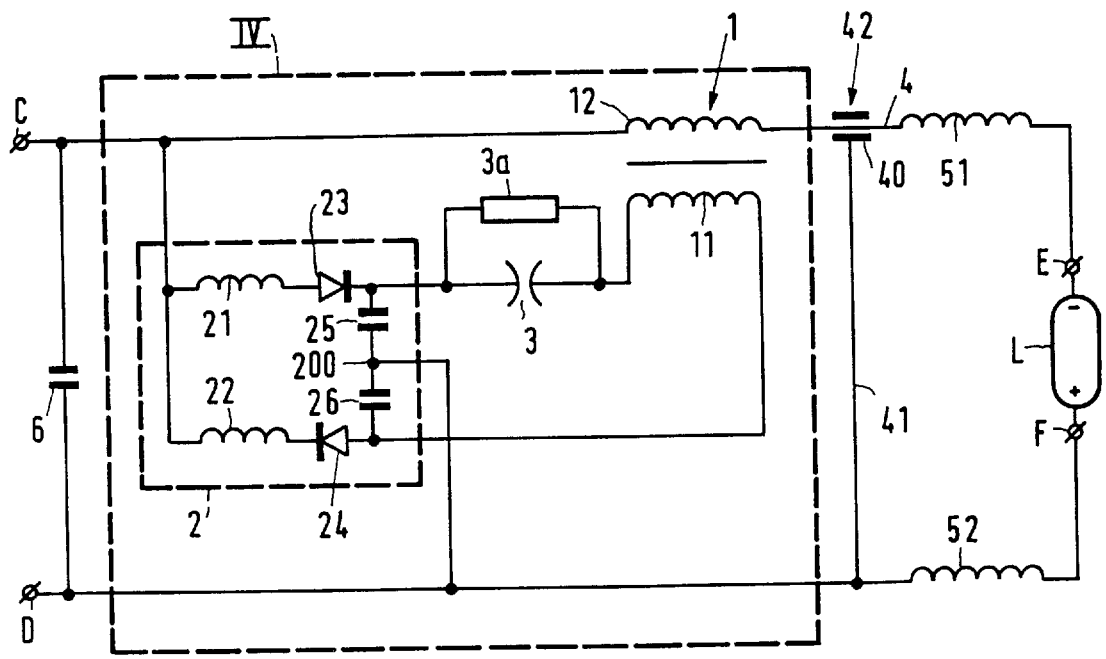
FIG. 2 is a portion of FIG. 1 which serves to ignite the lamp.

Block II forms a switch mode power supply by which a commutator circuit III is supplied. The commutator circuit III is connected as a supply source to a lamp circuit V via input terminals C, D of the lamp circuit. The lamp circuit V comprises a pulse-generating circuit IV and lamp connection terminals E, F between which a lamp L is connected. FIG. 2 shows the lamp circuit V in more detail.

In FIG. 2, input terminal C is connected to a pulse transformer 1. A primary winding 11 of the transformer 1 is connected in series with a voltage-dependent breakdown element 3 between input terminals C and D via a voltage-raising network 2. A secondary winding 12 of transformer 1 is connected at one side directly to input terminal C. At the other side, the secondary winding 12 is connected via a coaxial conductor 4 to a self-induction 51, which in its turn is connected to lamp connection terminal E. Sheath 40 of the coaxial conductor 4 is directly connected through a conductor 41 to input terminal D, and via a self-induction 52 to a lamp connection terminal F. The capacitance formed by the coaxial conductor is indicated with 42. Transformer 1, voltage-raising circuit 2 and voltage-dependent breakdown element 3, shunted by a leakage resistance 3a, together form a pulse generating circuit IV with a natural frequency. The self-inductances 51 and 52 form additional inductive means which together with capacitance 42 and secondary winding 12 form a transmission filter of which also the lamp connection terminals E and F form part. The tuning of the pass filter is chosen in relation to the natural frequency of the pulse-generating circuit.

In a practical realisation of an embodiment as described above, the circuit arrangement is suitable for igniting and operating a 100 W Philips high-pressure mercury lamp of the CSL-R type. The rated lamp voltage is 90 V and the rated lamp current frequency is 90 Hz.

Sub-circuits I and II are an input filter combined with a rectifier bridge and an up-converter combined with a down-converter, respectively, familiar from Philips electronic ballast type EMC 150.

The commutator circuit III is constructed as a bridge circuit, also in accordance with the known Philips electronic ballast type EMC 150. A no-load voltage of approximately 300 V is present at the connection terminals C, D of the commutator when a 220 V supply source is connected to terminals A, B.

Figure 3:
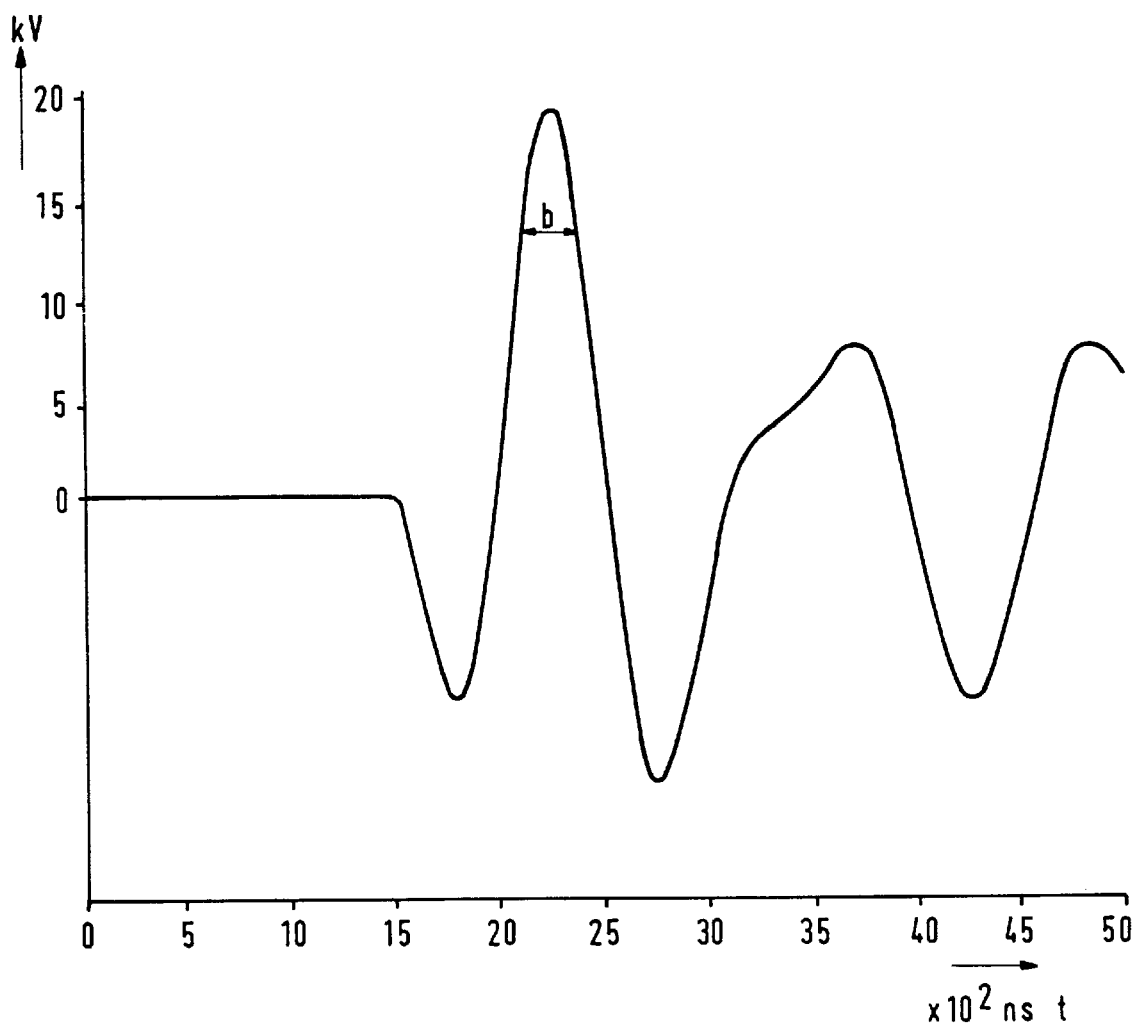
FIG. 3 shows a voltage generated by the circuit arrangement of FIGS. 1 and 2.

The voltage-raising circuit comprises two inductive elements which in the embodiment described are wound on a shared ferrite core and over which the no-load voltage of approximately 300 V is amplified to 1100 V. It is alternatively possible for the inductive elements to be provided each with its own core so as to form separate elements. The voltage-dependent breakdown element is a spark gap, make Siemens, with a breakdown voltage of 800 V, which is shunted by a leakage resistance 3a of 33 kohms to achieve a good operation of the voltage-raising circuit. This in fact achieves that the voltage across the capacitors of the voltage-raising circuit is well defined. This shunt resistance is also desirable for reasons of electrical handling safety. Also for safety, the connection between the capacitors of the voltage-raising circuit and input terminal D comprises a PTC resistor (not shown). A decoupling capacitor 6 of 1 nF is in addition connected between the input terminals C and D. The capacitors 25, 26 each have a value of 68 nF, and the self-inductances 21, 22 of 24 mH. The pulse transformer is a high-voltage transformer with a ferrite rod core, a primary winding of 4 turns and a secondary winding of 11 sections of 14 turns each. Both the primary winding and the secondary winding are formed from wire of 400 $\mu$m diameter. The coupling between primary and secondary windings here is 0.5. The transformer supplies an ignition pulse of at least 15 kV and at most 25 kV. The pulse thus generated has a width of approximately 300 ns measured at a level of 13.5 kV. The additional inductive means, consisting of two self-inductances, are formed from wire of 0.8 mm as a single layer of 45 turns around a ferrite rod core. Each self-induction is 54 $\mu$H. The capacitance formed by the coaxial conductor has a value of 12 pF. The self-inductance of the secondary winding of the pulse transformer is 1.1 mH. The total of the capacitances of the coaxial conductor, the secondary pulse transformer winding, and further parasitic capacitances present is approximately 20 pF. Said parasitic capacitances are formed inter alia by the lamp which has not yet ignited. The filter formed by the secondary winding, additional inductive means, lamp connection points and the capacitance mainly caused by the coaxial conductor is thus tuned to a frequency just above 1 MHz. Together with the pulse-generating circuit, which has a natural frequency of 1 MHz, the filter constitutes a band-pass filter. A generated ignition pulse is shown in FIG. 3. Time t is plotted on the horizontal axis in units of 500 ns per graduation. Voltage V is plotted on the vertical axis in units of 5 kV per graduation.

It is apparent from the Figure that the generated pulse has a width b of 300 ns at a voltage level of 13.5 kV.

When the lamp breaks down as a result of the generated pulse, a comparatively high breakdown current will flow through the lamp for a few nanoseconds immediately after breakdown. The additional inductive means 51, 52 present limit this breakdown current to approximately 8 A. This breakdown current is mainly supplied by the charged capacitances of the filter, in particular the capacitance formed by the coaxial conductor. Then the current supply is taken over by the commutator, and the run-up phase of the lamp commences, during which a stable discharge arc is gradually developed. During the run-up, a current of approximately 2 A initially flows through the lamp, which is reduced to 1 A when the stable discharge condition is reached.

We claim:

1. A circuit arrangement for igniting a high-pressure discharge lamp, comprising:

a pair of input terminals for connection to a supply source;

a pulse-generating circuit having a natural frequency and provided with a voltage-dependent breakdown element, said circuit being connected across said input terminals;

a pulse transformer having a primary winding and a secondary winding, the primary winding being included in said pulse-generating circuit, the secondary winding having a first terminal connected to a first of said input terminals; and coupling means for (i) coupling a second terminal of the secondary winding of the pulse transformer to a first connection terminal of said lamp, and (ii) coupling a second of said input terminals to a second connection terminal of said lamp; characterized in that:

said coupling means comprises filter elements which form, in combination with the secondary winding, a bandpass filter which is tuned to a frequency at or adjacent said natural frequency of the pulse-generating circuit, said filter elements including inductive means coupled in series between each of said input terminals and each of the lamp connection terminals;

whereby pulses generated by the pulse-generating circuit are coupled by said bandpass filter to said lamp to produce ignition thereof, but high-frequency signals produced by said lamp upon ignition thereof are substantially blocked by said bandpass filter from reaching the input terminals of said circuit arrangement.

2. A circuit arrangement as claimed in claim 1, characterized in that the pass filter elements further include capacitive means.

3. A circuit arrangement for igniting a high-pressure discharge lamp, provided with input terminals for connecting a supply source;

a pulse-generating circuit with a natural frequency and provided with a voltage-dependent breakdown element;

a pulse transformer; and an electrical connection between a secondary winding of the pulse transformer and lamp connection terminals, characterized in that the secondary winding of the pulse transformer and the lamp connection terminals form part of a pass filter with a tuning chosen in relation to the natural frequency of the pulse generating circuit, and characterized in that additional inductive means are present in the pass filter between the secondary winding and at least one of the lamp connection terminals and in that the additional inductive means are provided symmetrically as regards their values relative to the lamp connection terminals.

4. A circuit arrangement as claimed in claim 2, characterized in that said capacitive means comprises stray capacitance of the sheath of a coaxial conductor connecting the secondary winding of the pulse transformer to said first connection terminal of said lamp.

5. A circuit arrangement as claimed in claim 4, characterized in that a sheath of the coaxial conductor is in direct electrical contact with the second lamp connection terminal.

\* \* \* \* \*